United States Patent
Feron et al.

(10) Patent No.: US 10,752,250 B2
(45) Date of Patent: Aug. 25, 2020

(54) METHOD AND DEVICE FOR ASSISTING WITH CHANGE OF SPEED AND WITH CHANGE OF LANE

(71) Applicant: PSA AUTOMOBILES S.A., Poissy (FR)

(72) Inventors: Stephane Feron, Le Plessis Robinson (FR); Celine Taccori Duvergey, Montrouge (FR); Vincent Laine, Les Clayes sous Bois (FR)

(73) Assignee: PSA AUTOMOBILES SA, Poissy (FR)

( * ) Notice: Subject to any disclaimer, the term of this patent is extended or adjusted under 35 U.S.C. 154(b) by 265 days.

(21) Appl. No.: 16/063,778

(22) PCT Filed: Dec. 7, 2016

(86) PCT No.: PCT/FR2016/053252
§ 371 (c)(1),
(2) Date: Jul. 24, 2018

(87) PCT Pub. No.: WO2017/109321
PCT Pub. Date: Jun. 29, 2017

(65) Prior Publication Data
US 2019/0225223 A1    Jul. 25, 2019

(30) Foreign Application Priority Data
Dec. 21, 2015  (FR) ...................... 15 62914

(51) Int. Cl.
*B60W 30/18*      (2012.01)
*G08G 1/16*       (2006.01)
(Continued)

(52) U.S. Cl.
CPC .... *B60W 30/18163* (2013.01); *B60W 30/143* (2013.01); *B60W 50/08* (2013.01);
(Continued)

(58) Field of Classification Search
CPC .......... B60W 30/18163; B60W 50/08; B60W 30/143; B60W 2540/215; B60W 2555/60;
(Continued)

(56) References Cited

U.S. PATENT DOCUMENTS

2004/0098197 A1*  5/2004  Matsumoto ............ B62D 1/286
                                              701/301
2009/0088925 A1*  4/2009  Sugawara ............. B60W 30/12
                                              701/41
(Continued)

FOREIGN PATENT DOCUMENTS

DE         10134367 A1      1/2003
DE    10 2011005844 A1      9/2012
(Continued)

OTHER PUBLICATIONS

International Search Report for corresponding PCT/FR2016/053252 dated Aug. 3, 2017.
(Continued)

*Primary Examiner* — Frederick M Brushaber
(74) *Attorney, Agent, or Firm* — Sandberg Phoenix & von Gontard, P.C.

(57) ABSTRACT

The invention relates to a method for assisting driving, characterized in that it comprises steps of: —determination (220) of a proposal of change of lane, requiring a first validation, —determination (210) of a proposal of change of speed, requiring a second validation, —determination of a validation time (2') corresponding to a maximum time remaining to the driver, after the validation of the proposal of change of lane, to validate the proposal of change of speed, —if (240, 250) the validation time (2') is less than or equal to a predetermined threshold then the cancellation (260) of the proposal of change of lane.

10 Claims, 4 Drawing Sheets

(51) Int. Cl.
*B60W 30/14* (2006.01)
*B60W 50/08* (2020.01)

(52) U.S. Cl.
CPC ....... *G08G 1/167* (2013.01); *B60W 2540/215* (2020.02); *B60W 2555/60* (2020.02); *B60W 2720/103* (2013.01); *B60W 2720/106* (2013.01)

(58) Field of Classification Search
CPC ...... B60W 2720/103; B60W 2720/106; G08G 1/167
See application file for complete search history.

(56) References Cited

U.S. PATENT DOCUMENTS

| | | | |
|---|---|---|---|
| 2016/0229341 A1* | 8/2016 | Singhal | G02B 6/0006 |
| 2019/0084572 A1* | 3/2019 | Oishi | B60Q 1/34 |
| 2019/0225223 A1* | 7/2019 | Feron | B60W 30/143 |
| 2019/0283747 A1* | 9/2019 | Okabe | B60W 30/10 |

FOREIGN PATENT DOCUMENTS

| | | |
|---|---|---|
| DE | 10 2014 201282 A1 | 7/2015 |
| EP | 1552540 A1 | 7/2005 |
| WO | 2006122867 A1 | 11/2006 |
| WO | 2009103388 A1 | 8/2009 |

OTHER PUBLICATIONS

Written Opinion for corresponding PCT/FR2016/053252 dated Aug. 3, 2017.

\* cited by examiner

METHOD AND DEVICE FOR ASSISTING WITH CHANGE OF SPEED AND WITH CHANGE OF LANE

CROSS-REFERENCE TO RELATED APPLICATIONS

This application is the US National Stage of International Application PCT/FR2016/053252 which was filed Dec. 7, 2016, and which derives priority from French application No. 1562914 filed Dec. 21, 2015; both of which are hereby incorporated by reference.

FIELD OF THE INVENTION

The invention relates to assistance driving a vehicle, and more particularly assistance changing speed and changing lanes.

It has recently been proposed to equip certain vehicles with a control device making it possible to drive the vehicles automatically based on instructions provided by their driver, but without the driver acting on operational control members, such as the pedals or the steering wheel. This type of control device is therefore capable of controlling the operation of the powertrain, the assisted steering and the braking system of its vehicle based on information in particular relative to the environment of the latter (for example the curvature and slope of the traffic lane portion traveled, the signs and lines of this portion, and the relative speed of each detected vehicle). This control is done using commands that are provided to select actuators of the vehicle.

One such control device proposes a lane change maneuver to the driver, via a man-machine interface. Validation from the driver is required before the control device initiates the maneuver. In this way, the device leaves responsibility for the decision to the driver.

Also proposed, in patent application EP 1,552,540, is a device intended to regulate the speed of a vehicle making it possible for the vehicle to travel at a speed respecting a new speed limit in the location where the corresponding sign is located, while bothering other drivers as little as possible.

This device comprises processing means arranged, in response to validation by the driver of the vehicle of a new speed limit to be respected from a known position and below a current control rate, to trigger the non-saturation of a selected deceleration profile. The deceleration profile is able to cause the control rate in progress to decrease to a new control rate respecting the new speed limit.

This device, like the previous one, requires validation from the driver before applying the speed profile. In this way, the device leaves responsibility for the decision up to the driver.

A problem arises when two validation requests occur at substantially the same moment. This is for example the case when the vehicle reaches a highway bifurcation where it is necessary to change lanes and generally to slow down because the speed limit is lower in this zone.

SUMMARY

The invention therefore aims to resolve the aforementioned problem. To that end, it more specifically proposes a driving assistance method, characterized in that it includes the following steps:
determining a change of lane proposal, requiring a first validation,
determining a change of speed proposal, requiring a second validation,
determining a validation time corresponding to a maximum time remaining for the driver, after validation of the change of lane proposal, to validate the change of speed proposal,
if the validation time is less than or equal to a predetermined threshold, then canceling the change of lane proposal.

Maximum time remaining for the driver after validation of the change of lane proposal to validate the change of speed proposal refers to the maximum time during which the driver can validate the change of speed proposal after validating the change of lane proposal.

The method makes it possible to prevent the driver from having to validate two maneuvers at the same time. The method also makes it possible, when two maneuvers are proposed by the vehicle, to allow the driver enough time to validate these maneuvers, and in particular the change of speed maneuver.

The method makes it possible to resolve a conflict of proposals by time-shifting or canceling one of the proposals in order to allow the driver time to acknowledge both proposals, one after the other.

Advantageously, the step for determining a change of speed proposal includes calculating a position in which it is possible, later, to trigger the non-saturation of a maximum deceleration profile.

Advantageously, the step for determining a change of lane proposal includes calculating an end of maneuver position.

Advantageously, the validation time is equal to a travel time of the vehicle between the end of maneuver position and the position in which it is possible, later, to initiate the non-saturation of a maximum deceleration profile.

Advantageously, the step for determining a change of lane proposal includes calculating a validation position, corresponding to the last position in which the driver can acknowledge the change of lane validation proposal, wherein the validation time is equal to a travel time of the vehicle between the validation position and the position in which it is possible, later, to initiate the non-saturation of a maximum deceleration profile.

Advantageously, the driving assistance method further includes the following steps if the first proposal is the speed modification and the validation time is greater than the threshold:
abandoning the proposal of the first maneuver.
emitting the proposal of the lane change maneuver.

Advantageously, if the first proposal is the lane change and the validation time is greater than the threshold, the driving assistance method further includes a step for completing the lane change maneuver.

Advantageously, the driving assistance method further includes a step for emitting the speed proposal.

The invention also relates to a driving assistance device, characterized in that it is arranged to:
determine a lane change proposal, requiring a first validation,
determine a speed change proposal, requiring a second validation,
determine a validation time corresponding to a maximum time remaining for the driver after validation of the lane change proposal to validate the speed change proposal,
if the validation time is less than or equal to a predetermined threshold ($S_1$), then cancel the lane change proposal.

The invention also relates to a vehicle, characterized in that it includes an automated driving assistance system as described above.

DESCRIPTION OF THE FIGURES

Other features and advantages of the invention will appear upon examining the following detailed description and the appended drawings, in which.

The appended drawings may not only serve to complete the invention, but also contribute to defining it, if applicable.

DESCRIPTION

Figure 1:
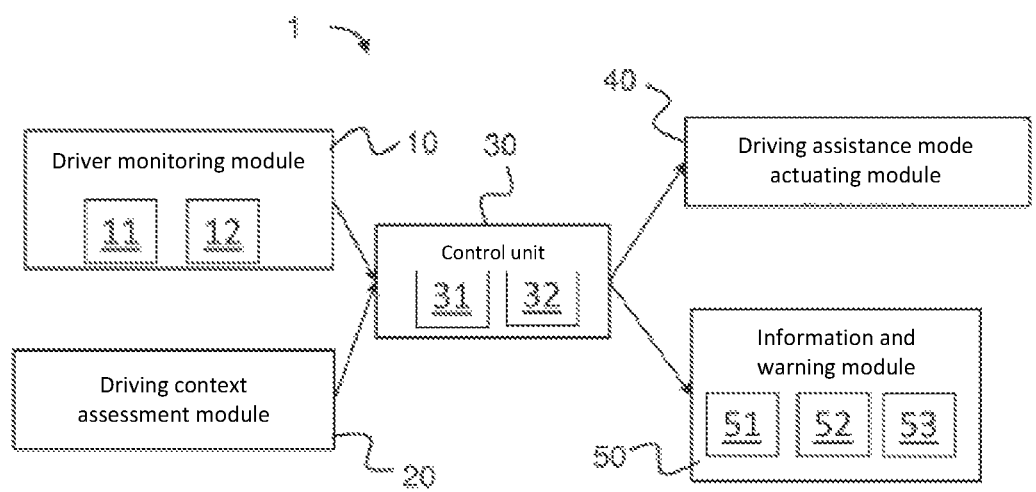
FIG. 1 illustrates the automated driving assistance system.

In reference to FIG. 1, the automated driving assistance system 1 includes a driver monitoring module 10, a driving context assessment module 20, a control unit 30, a driving assistance mode actuating module 40, and an information and warning module 50.

The driver monitoring module 10 for example comprises a sub-module 11 for detecting the presence of the driver's hands on the steering wheel 10, as well as a sub-module 12 for detecting the presence of the driver's feet on the accelerator, brake and clutch pedals.

The driver monitoring module 10 may also include a camera pointed at the driver's face so as to determine the latter's attention level and/or the direction of his gaze.

The driving context evaluation module 20 for example comprises a camera of the CCD (Charge Coupled Device) type pointing toward the front of the vehicle and delivering images making it possible to determine the type of road being used (highway, fast road or side road) from certain characteristic parameters such as the width of the road, the ground marking (color, width and spacing of the lines) and the presence of any barriers or a central separating median strip between the two traffic directions. The analysis of the images provided by this camera further makes it possible to establish the level of fluidity of the road traffic.

The module 20 also includes a plurality of sensors measuring certain internal driving parameters such as the instantaneous speed of the vehicle and the steering angle of the steering wheel.

The data collected by the two modules—the driver monitoring module 10 and the driving context assessment module 20—is sent in real-time to the control unit 30, to which these two modules are connected.

The control unit 30, preferably made up of the smart service box (SSB) of the vehicle, includes a computer 31 as well as a storage module 32 comprising non-volatile memory of the EEPROM or FLASH type and random-access memory.

Figure 2:
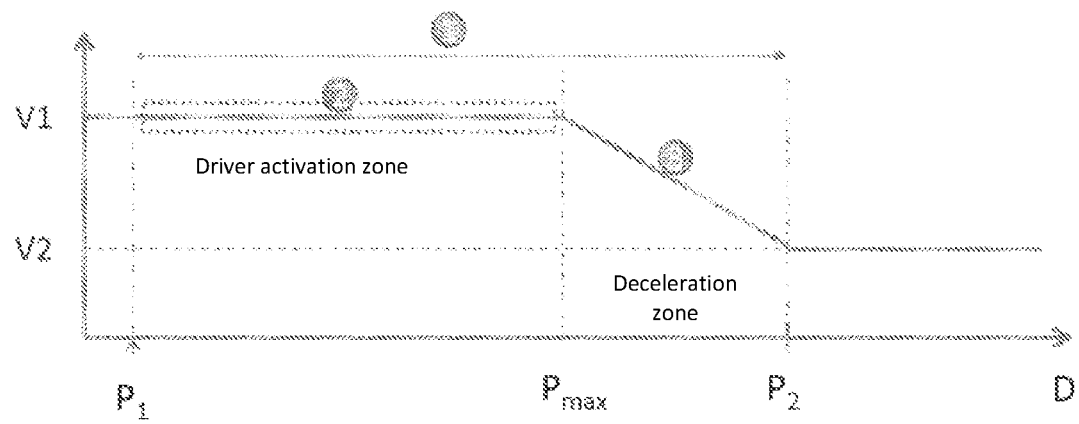
FIG. 2 illustrates, within a diagram, an example evolution curve of the speed of a vehicle, subject to a speed regulation according to a deceleration profile, as a function of distance.

The nonvolatile memory stores a process to help activate driving assistance modes of the motor vehicle, the flowchart which is shown in FIG. 2 and which is for example carried out cyclically according to a predetermined period preferably between 100 ms and 1000 ms.

The set of information contained in this non-volatile memory can be updated by a communication means or by a means for reading a data medium.

The control unit 30 is connected to the actuating module 40, to which it is able to send the order to activate or deactivate one of the driving assistance modes.

This actuating module 40 includes a plurality of actuators able to control certain members of the vehicle such as the steering, acceleration, braking and gearbox to see to the implementation of different driving assistance modes with which the vehicle is provided, namely in the case at hand:

an assistance mode for changing speeds of the vehicle; and an assistance mode for changing driving lanes of the vehicle.

The information and warning module 50 includes a first information screen 51 integrated into the instrument panel and/or a head-up display able to broadcast visual messages, for example to request confirmation before engaging the maneuver.

FIG. 2 illustrates, within a diagram, an example evolution curve of the speed of the vehicle, subject to a speed regulation according to a deceleration profile, as a function of the distance.

The speed change assistance proposes, to the user, a modification of the speed at a first position $P_1$. This position is located at a distance 1 from a new speed limit sign located at a second position $P_2$. The user thus has the entire distance 2 in order to validate this proposal to allow the vehicle to brake suitably over the distance 3.

The deceleration profile is able to decrease the regulated speed V1 up to a new control speed V2, which is at most equal to the new speed limit substantially in the position of the panel $P_2$. This decrease must take place between a first position $p_{acc}$ of the vehicle at a moment where its driver validates the new proposed speed limit and a second position $p_{max}$ in which it is possible, at latest, to initiate the non-saturation of a maximum deceleration profile.

Here, "deceleration profile" refers to the variation of the speed of the vehicle that allows the vehicle to go from the speed V1 to the speed V2.

Furthermore, here, "maximum deceleration profile" refers to the deceleration profile that makes it possible to take the vehicle as quickly as possible from V1 to V2 without a deterioration in passenger comfort exceeding a predefined threshold and without the behavior of the vehicle being dangerous for other users of the road (for example due to abrupt braking with no apparent reason).

Figure 3:
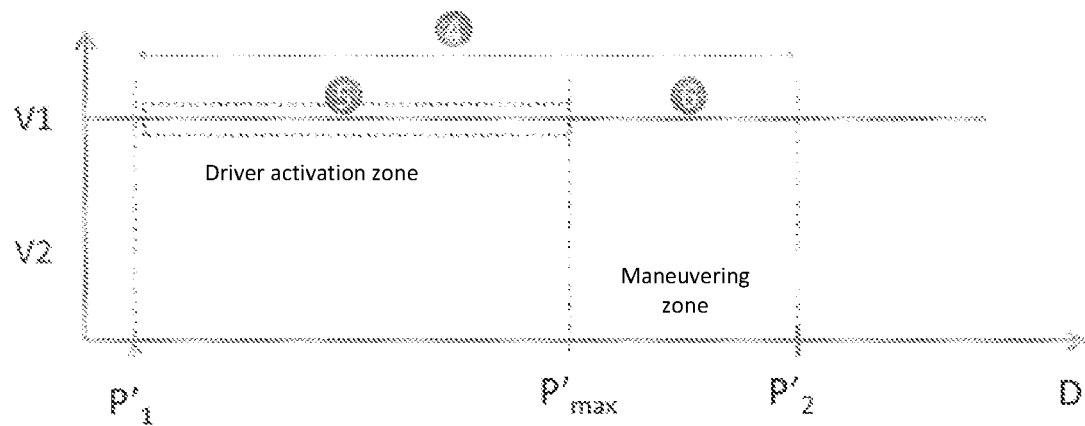
FIG. 3 illustrates, within a diagram, an example progression of a lane change maneuver, as a function of distance.

FIG. 3 illustrates, within a diagram, an example progression of the lane change maneuver, as a function of distance.

The change assistance proposes a change of lane at a first position $P'_1$. The driver next has a time 5 (or distance) to validate the lane change maneuver. The vehicle needs a time 6 (or distance) to perform the maneuver. The lane change maneuver is complete when the vehicle is located at a second position $P'_2$. Time 4 refers to the time corresponding to the sum of the time 5 and the time 6.

Figure 4:
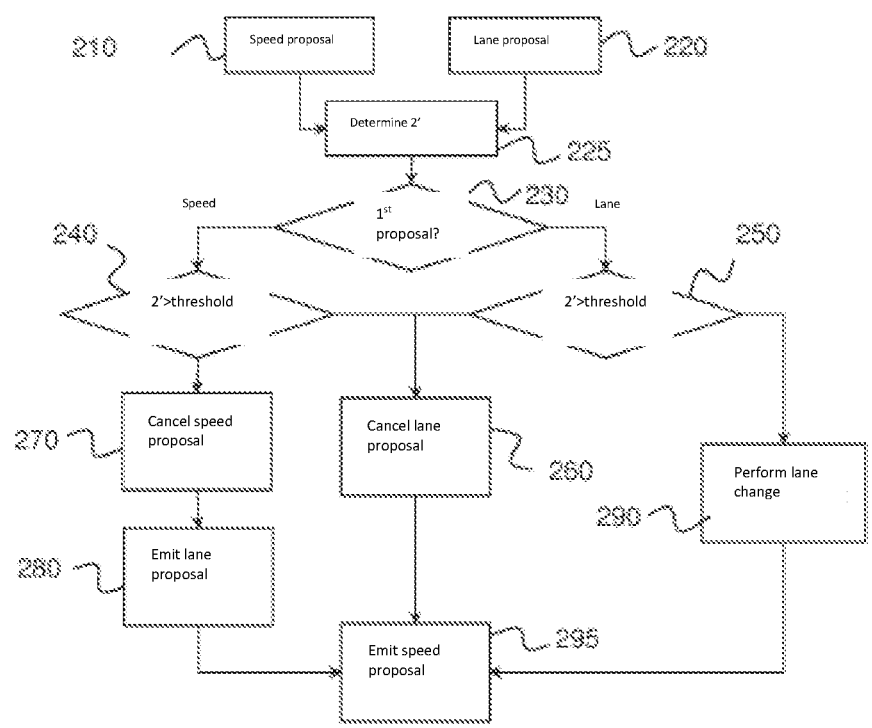
FIG. 4 illustrates a flowchart showing the method according to the invention.

We will now describe, in detail and using the flowchart of FIG. 4, the various steps of the first alternative of the method.

The driving assistance method includes a step 210 for determining a lane change proposal by a lane change assistance mode. The proposal requires a first validation.

The driving assistance method also includes a step 220 for determining a speed change proposal by a speed change assistance mode. The proposal requires a second validation.

Figure 5:
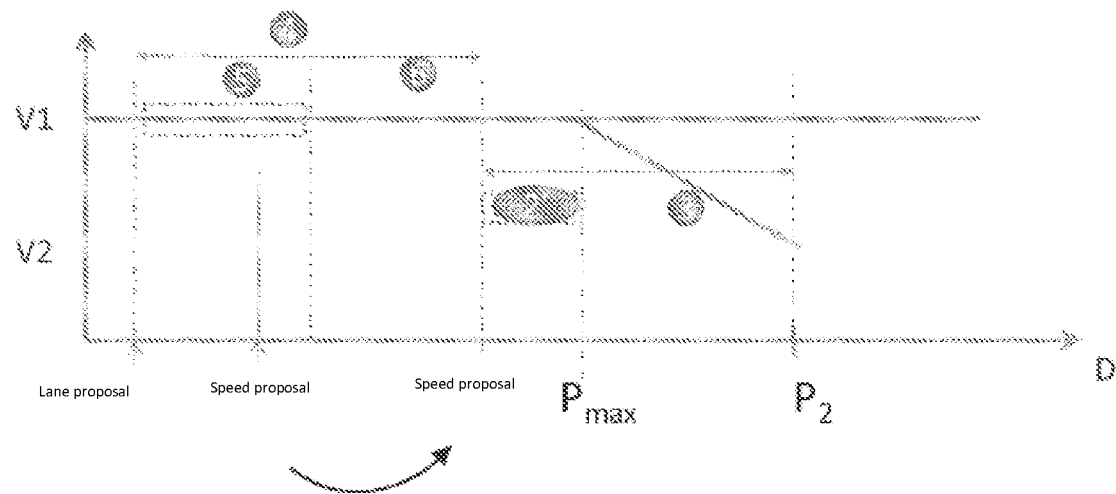
FIG. 5 illustrates a first case where a lane change must be validated before a speed change.
Figure 6:
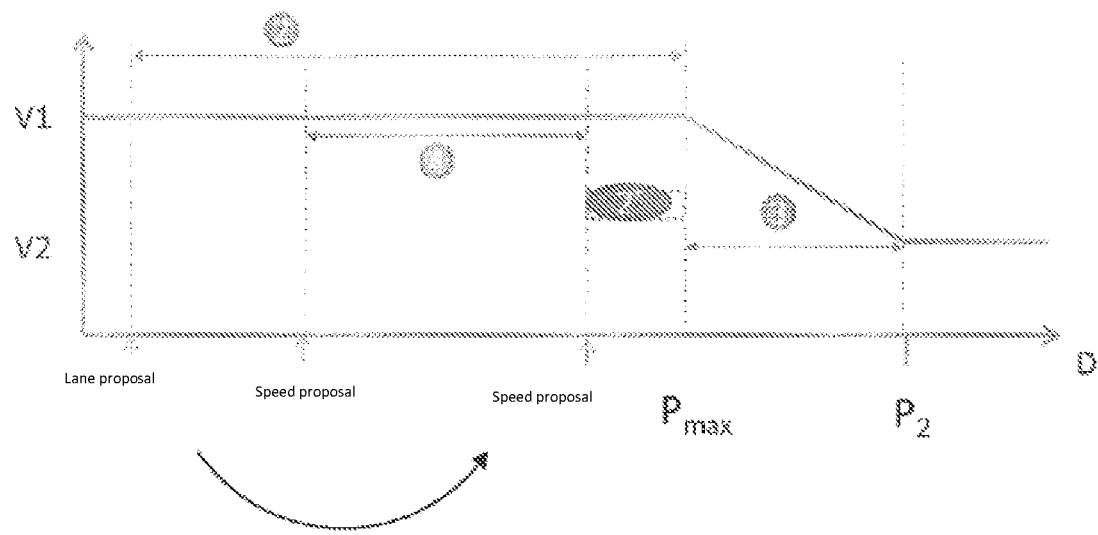
FIG. 6 illustrates a second case where a speed change must be validated before a lane change.

Two scenarios may be distinguished: a first case where the lane change must be validated before the speed change (illustrated in FIG. 5) and a second case where the speed change must be validated before the lane change (illustrated in FIG. 6).

In all scenarios, the method includes determining at step 225 a validation time (2') corresponding to a maximum time remaining for the driver after validation of the lane change proposal to validate the speed change proposal.

If at steps 240, 250 the validation time (2') is less than or equal to a predetermined threshold (51), then the lane change proposal is canceled at step 260.

It is considered that the driver does not have enough time, in which case the lane change maneuver must be eliminated in favor of the speed change maneuver. The method thus favors compliance with the speed limits.

It will be recalled that:
the step 220 for determining a speed change proposal includes calculating a position $P_{max}$ in which it is possible, at the latest, to trigger the non-saturation of a maximum deceleration profile.
the step 210 for determining a lane change proposal includes calculating an end of maneuver position $P'_2$.

According to a first embodiment, the validation time 2' is equal to a travel time of the vehicle between the end of maneuver position $P'_2$ and the position $P_{max}$.

In this embodiment, it is considered that the speed proposal can only be emitted once the lane change maneuver is complete. In this way, the driver can supervise the lane change maneuver without being bothered by the speed change proposal.

It will also be recalled that the step 210 for determining a lane change proposal includes calculating a validation position $P'_{max}$, corresponding to the last position at which the driver can acknowledge the lane change validation proposal.

In a second embodiment, the validation time 2' is equal to a travel time of the vehicle between the validation position $P'_{max}$ and the position $P_{max}$.

This embodiment allows the emission of a proposal during the lane change maneuver. This embodiment has the advantage of allowing two proposals to be sequenced over a shorter length of time.

The driving assistance method further includes, if the first proposal is the modification of the speed at step 230 and the validation time (2') is above the threshold at step 240:
a step 270 for abandoning the proposal of the first maneuver.
a step 280 for emitting the proposal of the lane change maneuver.

The driving assistance method further includes, if the first proposal at step 230 is the lane change and the validation time 2' is greater than the threshold at step 250, a step 290 for completing the lane change maneuver.

The driving assistance method further includes a step 295 for emitting the speed proposal.

In all scenarios, the method finishes by proposing a change of speed to the driver so as to respect the limit imposed by the sign.

FIG. 5 illustrates a case where a lane change proposal arrives before a speed change proposal. It is assumed that the device determines at step 210 a lane change proposal and that it also determines a speed change proposal having to be emitted during a phase 5. The phase 5 is a phase during which the driver can validate (or not validate) the lane change proposal. Before submitting a speed change proposal to the driver, the device determines at step 225 a validation time 2' corresponding to the time remaining for the driver, after the lane change maneuver, to validate the speed change.

If the validation time 2' is greater than a predefined threshold 51 (which allows enough time for the driver to perform the validation), the device proposes at step 295 the speed change once the lane change maneuver has been done.

If the validation time 2' is less than the predefined threshold $S_1$, the lane change validation request is canceled at step 260. The vehicle instead requests at step 295 the validation of the speed change.

FIG. 6 illustrates a case where a speed change proposal arrives before a lane change proposal. It is assumed that, during a phase 2, the device determines (or the driver requests) a lane change. Phase 2 is a phase during which the driver can validate (or not validate) the speed change proposal.

Before submitting the lane change proposal to the driver, the vehicle calculates a validation time 2' corresponding to the time remaining for the driver, after the lane change maneuver, to validate the speed change. The estimate of the duration of the phase 4 corresponding to the lane change comprises: a time given to the driver to validate and time for the maneuver itself.

If this validation time 2' is above a predefined threshold (51), the vehicle cancels at step 270 the speed change proposal and proposes at step 280 the lane change maneuver. The speed change proposal reappears at step '295 once the lane change maneuver is done. If the validation time 2' is below a predefined threshold, the vehicle does not propose at step 260 the lane change maneuver (or refuses it if it is at the initiative of the driver and continues at step 295 the engaged speed change proposal).

The invention claimed is:

1. A driving assistance method, wherein the method includes the following steps:
electronically determining a change of lane proposal, requiring a first validation,
electronically determining a change of speed proposal, requiring a second validation,
electronically determining a validation time corresponding to a maximum time remaining for the driver, after validation of the change of lane proposal, to validate the change of speed proposal, and
if the validation time is less than or equal to a predetermined threshold ($S_1$), then canceling the change of lane proposal.

2. The driving assistance method according to claim 1, wherein the step for determining a change of speed proposal includes calculating a position ($P_{max}$) in which it is possible, later, to trigger the non-saturation of a maximum deceleration profile.

3. The driving assistance method according to claim 2, wherein the step for determining a change of lane proposal includes calculating an end of maneuver position ($P'_2$), and wherein the validation time is equal to a travel time of the vehicle between the end of maneuver position ($P'_2$) and the position ($P_{max}$) at which it is possible, later, to initiate the non-saturation of a maximum deceleration profile.

4. The driving assistance method according to claim 2, wherein the step for determining a change of lane proposal includes calculating a validation position ($P'_{max}$), corresponding to the last position in which the driver can acknowledge the change of lane validation proposal, the validation time being equal to a travel time of the vehicle between the validation position ($P'_{max}$) and the position ($P_{max}$) at which it is possible, later, to initiate the non-saturation of a maximum deceleration profile.

5. The driving assistance method according to claim 1, wherein the step for determining a change of lane proposal includes calculating an end of maneuver position ($P'_2$).

6. The driving assistance method according to claim 1, wherein, if the first proposal is the speed modification and the validation time is greater than the threshold, the method further includes the following steps:
   abandoning the proposal of the first maneuver; and
   emitting the proposal of the lane change maneuver.

7. The driving assistance method according to claim 1, wherein, if the first proposal is the lane change and the validation time is greater than the threshold, the method further includes a step for completing the lane change maneuver.

8. The driving assistance method according to claim 1, wherein the method further includes a step for emitting the speed proposal.

9. A driving assistance device, wherein the assistance device is adapted to:
   determine a lane change proposal, requiring a first validation,
   determine a speed change proposal, requiring a second validation,
   determine a validation time corresponding to a maximum time remaining for the driver after validation of the lane change proposal to validate the speed change proposal, and
   if the validation time is less than or equal to a predetermined threshold ($S_1$), then cancel the lane change proposal.

10. A vehicle, including a driving assistance device according to claim 9.

* * * * *